United States Patent [19]

Max

[11] Patent Number: 4,506,513
[45] Date of Patent: Mar. 26, 1985

[54] COLD TRAP

[76] Inventor: John K. Max, 1420 Healdsburg Ave., Healdsburg, Calif. 95448

[21] Appl. No.: 505,524

[22] Filed: Jun. 17, 1983

[51] Int. Cl.³ .............................................. B01D 8/00
[52] U.S. Cl. .................................... 62/55.5; 55/269; 62/268; 62/278
[58] Field of Search ............... 62/100, 268, 55.5, 278, 62/93, 94; 55/267, 268, 269; 417/901

[56] References Cited

U.S. PATENT DOCUMENTS

| | | | |
|---|---|---|---|
| 1,974,145 | 9/1934 | Atwell | 62/93 |
| 2,015,288 | 9/1935 | Rosen | 62/93 |
| 2,015,490 | 9/1935 | McAllister | 55/269 |
| 2,301,529 | 11/1942 | Fagan | 55/269 |
| 3,124,443 | 3/1964 | Hellingman et al. | 55/269 |
| 3,188,785 | 6/1965 | Butler | 55/269 |
| 3,366,107 | 1/1968 | Frantom | 55/269 |
| 3,593,495 | 7/1971 | Ellison | 55/269 |
| 3,636,723 | 1/1972 | Kramer | 62/278 |
| 3,854,300 | 12/1974 | Gerhold | 62/93 |

*Primary Examiner*—Ronald C. Capossela
*Attorney, Agent, or Firm*—Townsend and Townsend

[57] ABSTRACT

A cold trap for removing contaminants from a vapor stream has a coolant expansion chamber extending the length of the cold trap housing and a stack of spaced-apart, perforated disk-shaped baffles mounted about the outside of the expansion chamber. A coolant feed tube is mounted inside, and extends the length of, the expansion chamber. Coolant exits the feed tube into the expansion chamber through a small tangential outlet hole in the bottom of the feed tube to increase coolant turbulence and heat transfer efficiency. The cold trap causes the vapor stream to pass through one or more centrifugal separation and condensation stages defined by the baffles to remove solid particles, mists and condensates. A reversible refrigeration system is used both to cool the cold trap and to rapidly defrost it. This permits the rapid liquification and drainage of collected contaminants. The trap is easily taken apart for manual cleaning of residue, and is thus well suited for removing gummy and reactive contaminants removed from the vapor stream.

17 Claims, 6 Drawing Figures

COLD TRAP

BACKGROUND OF THE INVENTION

1. Field of the Invention

The present invention relates to cold trap systems and specifically to an efficient and easily cleaned high pressure cold trap system.

2. Prior Art

Cold traps are used to remove gases having a relatively high temperature of solidification, or sometimes liquefaction, from a gas with a lower temperature of solidification. They can also be used to remove particulate matter from the gas. Cold traps are usually used to remove gaseous or particulate contaminants from a vapor stream. The condensate, which may comprise molecules of a higher vapor pressure than the dry gas produced, is typically disposed of. Cold traps are often used to remove water from a compressed air supply, or to remove hydrocarbons from a vacuum system.

A cold trap provides a cold surface which the contaminant is likely to encounter. Molecules are immobilized by freezing onto or by adsorption into the cold surface. The mean free path of molecular flow through a cold trap is determined by the trap's operating pressure. The higher the pressure the shorter the mean free path. To insure that all of the molecules eventually collide with a cold surface, the flow paths must be more circuitous at higher pressures. Therefore, cold traps are designed for and are available for different operating pressure ranges.

Cold traps are well known for the submillimeter vacuum pressure range of $10^{-2}$ to $10^{-9}$ mm Hg. At these low pressures the mean free path of a molecule is relatively long, 3 mm to $3 \times 10^7$ cm. Low pressure traps typically employ chevrons or simple baffle arrangements that prevent molecules from traveling in a straight line through the trap. However, these traps are ineffective at pressures above 0.5 mm. At higher pressures, molecules must encounter a cold surface within a short distance to have an adequate probability of being caught. Otherwise molecules block each other in their passage through the trap.

High pressure traps are also well known for removing water vapor from compressed air streams, or for removing other vapors which, when condensed, have a low enough viscosity to drain from the trap. However, these traps are not suitable for condensing gummy contaminant substances which can be formed. For example, polyurethane resin has components such as Toluene Diisocyanate (TDI) and Methylene Di-paraphenylene Isocyanate (MDI). When a vacuum pump is used to draw vapor from a tank of liquid polyurethane resin, the TDI's and MDI's can react with the pump's lubricating oil to produce gummy contaminants. TDI and MDI vapors can also react with moisture, and to some extent other impurities in a vapor stream, to form a gum. Prior art cold traps, used to remove such gummy contaminants, must be periodically scrubbed with strong hot solvents to remove the residue.

There is a need for a cold trap to operate at pressures ranging from 0.5 mm to 760 mm, at $-40°$ C., and which can be used to remove vapors such as TDI's and MDI's, mists and gummy substances from a vapor stream. The trap should be quickly heatable to defrost the condensate, should allow melted material to drain out, and should be easy to disassemble, clean and reassemble.

SUMMARY OF THE INVENTION

It is an object of this invention to provide a cold trap which is more efficient and easier to clean than the prior art cold traps. This is achieved by providing a cold trap having a stack of perforated disk shaped baffles inside the trap and a cooling gas expansion chamber extending the length of the trap. A refrigerant feed tube is mounted inside, and extends the length of, the expansion chamber. The baffles are supported by the cooling gas expansion chamber. The extended length expansion chamber cools the baffles more evenly and efficiently than baffles are cooled in prior art traps.

A small baffle inside the top of the expansion chamber and a small tangential outlet hole in the bottom of the feed tube increase coolant turbulence inside the expansion chamber to improve heat transfer efficiency. A reversible refrigeration system is used both to cool the cold trap and to rapidly defrost it. This permits the liquification and drainage of collected contaminants much more rapidly and effectively than prior art traps, which were passively thawed. The trap is easily taken apart for manual cleaning of residue, and is thus well suited for removing gummy and reactive contaminants removed from the vapor streams.

Other objects, features and advantages will appear from the following description in which the preferred embodiment has been set forth in detail in conjunction with the accompanying drawings.

DETAILED DESCRIPTION OF THE PREFERRED EMBODIMENT

Figure 1:
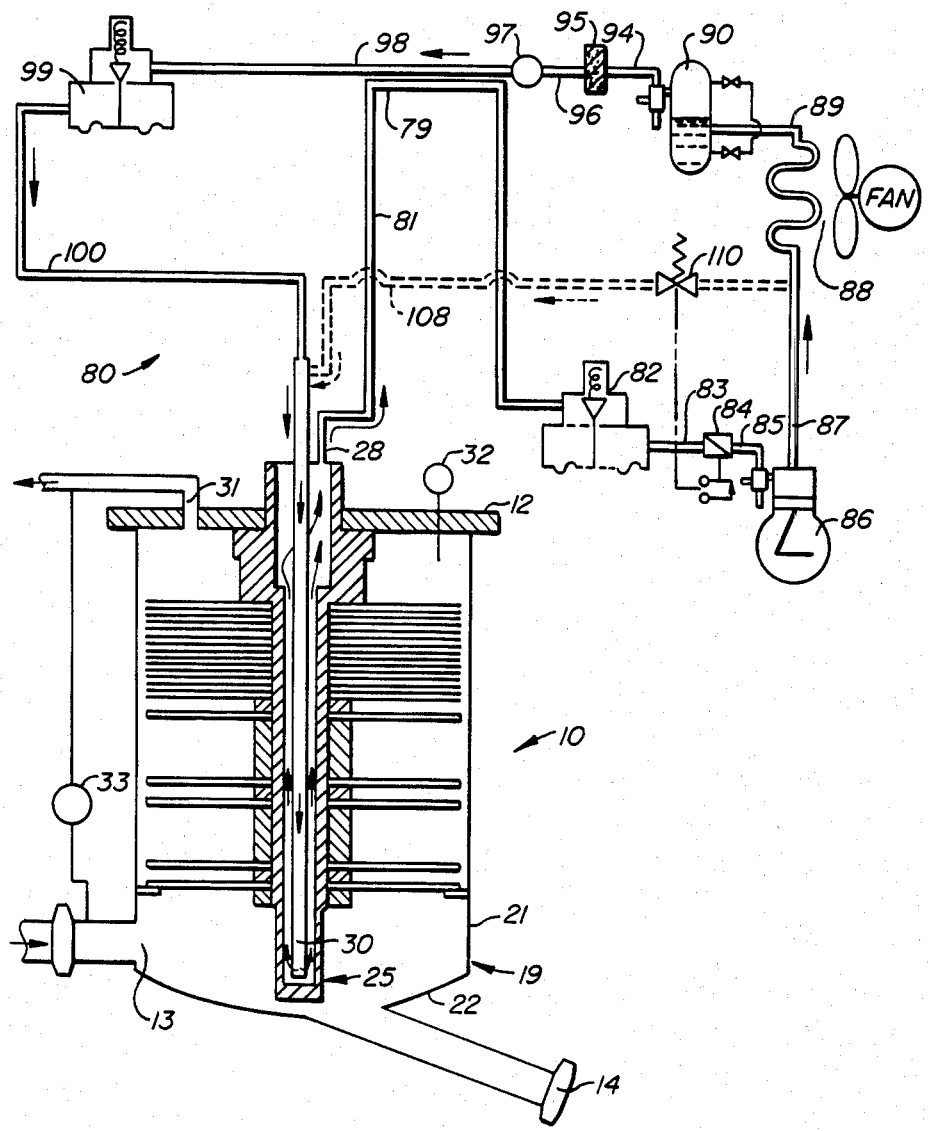
FIG. 1 is a cross section of the trap and a diagram of the refrigerant cooling system in cooling mode.
Figure 2:
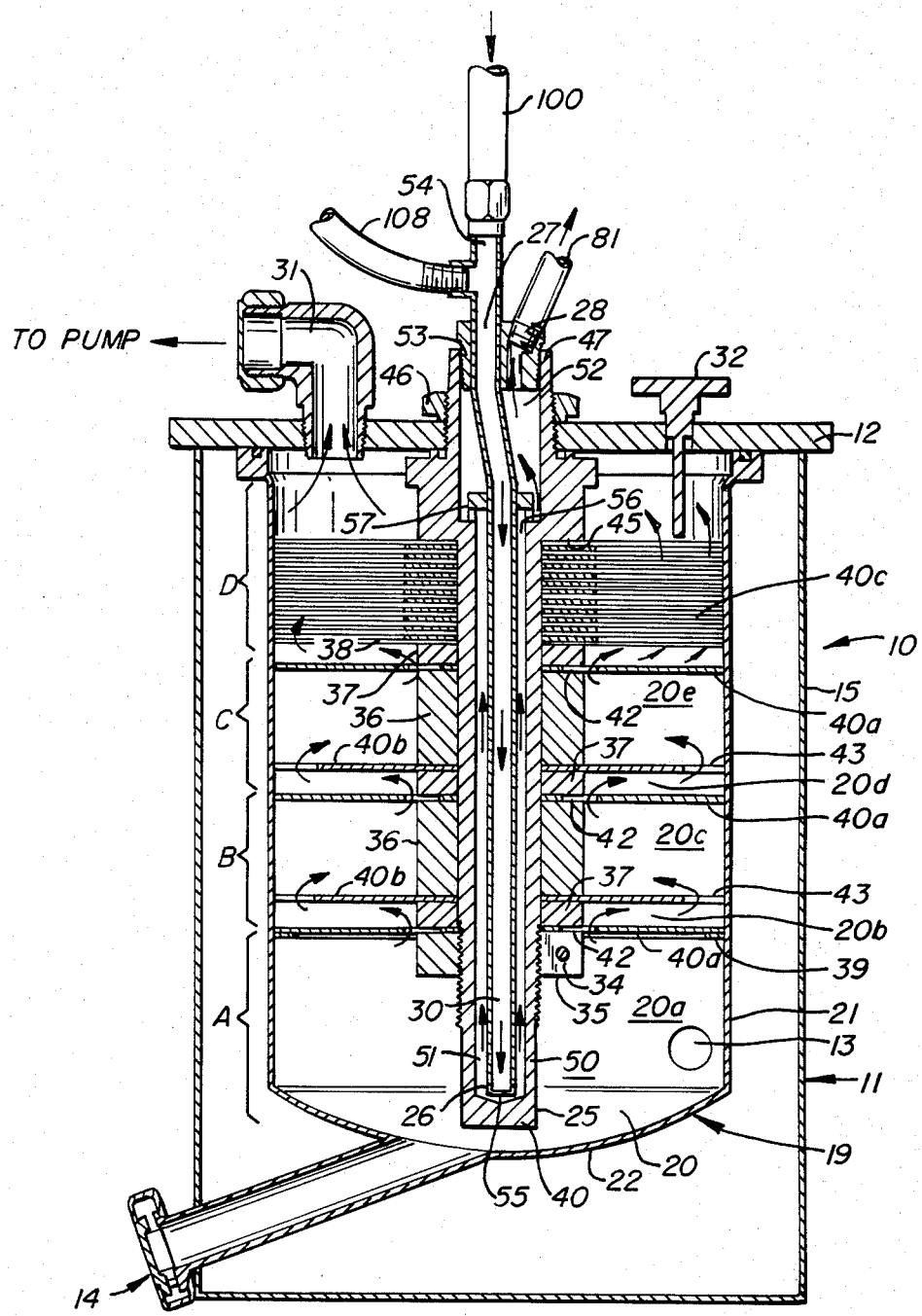
FIG. 2 is a cross sectional elevation of the cold trap of FIG. 1.

Referring to FIG. 1, the cold trap system comprises a cold trap 10 and a refrigeration system 80. The refrigeration system has a cooling mode for normal operation, and a heating mode for defrost operation. The cold trap 10, shown in more detail in FIG. 2, will be described first.

Cold trap 10 comprises a cylindrical tank 11 having an internal chamber 20 and a cover 12. Internal chamber 20 includes an axially disposed hollow expansion chamber 25. Gaseous FREON 502 ®, or some other suitable coolant, is supplied to expansion chamber 25 through a coolant supply line 100 by refrigeration system 80, as described in more detail below, to cool chamber 20. Insulation may be placed between tank 11 and an inner wall 19 which defines chamber 20. Inner wall 19 includes a sidewall 21 and a bottom 22.

Figure 3:
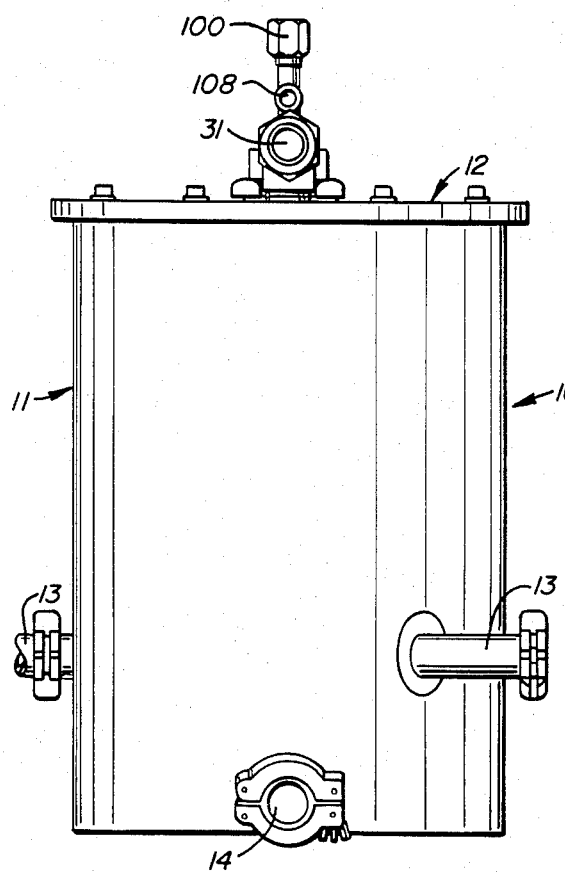
FIG. 3 is an elevation of the cold trap.

The trap has a four stage separation system within chamber 20. The vapor stream to be cooled and decontaminated enters the first stage A in the bottom of the trap through a pair of vapor inlets 13 (see FIG. 3). Both of the vapor inlets 13 are oriented tangentially to sidewall 21 so that vapor streams entering with sufficient velocity will swirl around the lower end of expansion chamber 25 in chamber region 20a of first stage A. Centrifugal force urges solid particles and mist in the vapor stream, cooled by expansion chamber 25, outwardly against sidewall 21 where they coalesce or condense and settle along bottom 22. The condensate, because of the low temperature of expansion chamber 25, often freezes to sidewall 21 and on bottom 22. The condensate will drain out through a drain 14 in the bottom 22 during a defrost cycle. Expansion chamber 25 is heated during the defrost cycle (as described below) to aid liquification and removal of the contaminants collected within chamber 20.

Figure 4A:
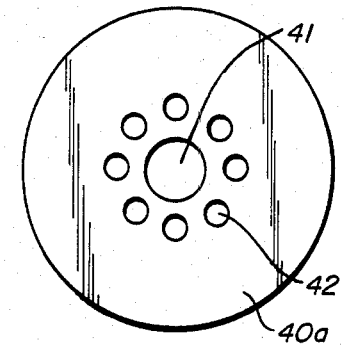
FIGS. 4A, 4B and 4C are plan views of the baffles used in the cold trap.
Figure 4B:
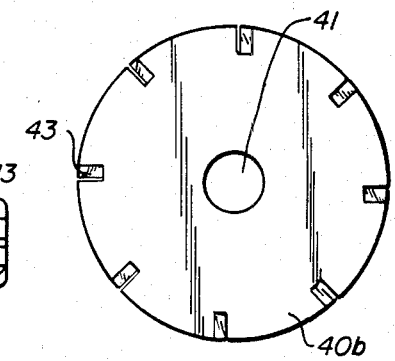
Figure 4C:
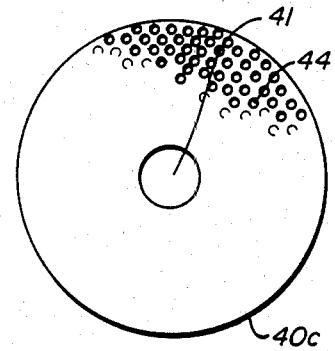

As shown in FIGS. 4A, 4B and 4C, different patterns of perforations are used in baffles 40a, 40b, and 40c to alter and increase the path length of the vapor flow through the trap. The baffles are all circular disks and each includes a central mounting hole 41 sized for mounting over the cylindrical outer surface of expansion chamber 25. Baffles 40a (FIG. 4A) each includes eight holes 42 surrounding hole 41. Baffles 40b each includes eight angled slots 43 spaced about its periphery. Slots 43 are angled to impart a rotary motion to the vapor stream passing through them so second stage B and third stage C act as centrifugal separation stages. The angled slots also help to increase turbulence of the vapor stream to thus enhance cooling effectiveness. Baffles 40c each include numerous small perforations 44 covering its surface to make fourth stage D a condensation stage.

Baffles 40a-40c are positioned along expansion chamber 25 by two long spacers 36, three medium spacers 37, and eleven short, washer-like spacers 38. Spacers 36 and 37 have a cylindrical shape. The spacers help to provide effective heat conduction between the baffles and expansion chamber 25. The stack of baffles 40a-40c and spacers 36-38 are positioned between a split nut 35, threadably mounted to expansion chamber 25, and an upper shoulder 45 of chamber 25. A clamping screw 34 is used with split nut 35 so when screw 34 is loosened, nut 35 expands and can be removed easily even if coated with gummy residues.

A snap ring 39 fits snuggly against the lowest baffle 40a. Snap ring 39 prevents the centrifuged liquid in first stage A from slipping up and around the periphery of lowest baffle 40a. Expansion chamber 25, together with baffles 40a-40c and spacers 36-38, is fastened to cover 12 to be suspended within internal chamber 20 by a nut 46 threaded to an upper extension 47 of expansion chamber 25.

The vapor leaves region 20a of first stage A through holes 42 in the lowest baffle 40a and passes into region 20b of second stage B. The vapor stream flows radially outwardly and then through angled slots 43 in the lowest baffle 40b and into region 20c of second stage B. The second stage both cools the vapor stream and subjects it to centrifugal forces, through the action of angles slots 43, to help separate out fine mists as condensates. The vapor leaves second stage B through a second baffle 40a, and enters region 20d of third stage C.

The arrangement of second stage B is repeated in third stage C, which inludes a region 20e. Mist, vapors, particles and other condensates collected in second and third stages B and C drip down past first and second baffles 40a and 40b and collect on bottom 22. Gummy residues must await cleaning of cold trap 10 while moisture and any other similarly liquifiable condensates, which will usually freeze within chamber 20, will melt and collect on bottom 22 during the defrost cycle described below. By the time the vapor stream leaves the third stage through the uppermost first baffle 40a, mist and particles have been effectively removed.

The fourth, and final, stage D comprises a series of thin metal baffles (or wire screens) 40c, each having thousands of small perforations 44. These perforated baffles 40c provide a large surface area and a short mean free path for collecting condensible materials. After passing through baffles 40c the vapor passes out of cold trap 10 through a gas outlet 31. First, second and third stages A, B and C thus act as centrifugal separator stages while fourth stage D acts as a vapor condensation stage.

Chamber 25 includes an outer housing 50 defining an elongate lower chamber volume 51 and an upper chamber volume 52. An elongate feed tube 30 is supported within, and extends along the entire length of, both upper and lower volumes 51, 52 by a threaded plug 53. Tube 30 has an open upper end 54, connected to a supply line 100 from refrigeration system 80, and a closed lower end 55 adjacent the bottom of lower chamber volume 51.

The coolant is delivered to chamber 25 at a regulated pressure by refrigeration system 80. The coolant exits the bottom of feed tube 30 by way of one or more small tangential pin holes 26 formed through the wall of tube 30 to create a turbulent coolant flow near the bottom of lower chamber volume 51. Coolant, after exiting pin holes 26, flows upwardly through lower chamber volume 51, through a pair of radial slots 56 formed in a circular collar 57 and into upper chamber volume 52. Turbulence is imparted to the coolant by passing through slots 56 for improved heat transfer in upper volume 52 of expansion chamber 25. Other turbulence producing means may be used in lower and upper volumes 51, 52 as well. The coolant exits through a coolant return port 28 in plug 53 and into a return line 81.

Turning now to FIG. 1, coolant, as a vapor, exits return port 28 at approximately 15 psia and $-40°$ C. and returns to the refrigeration system 80. The coolant vapor passes through return line 81 to over-pressure regulator 82 (inactive in cooling mode) and through line 83 to temperature switch 84 (also inactive in cooling mode). Coolant enters conventional refrigeration compressor 86 by an inlet line 85, and exits by a compressor output line 87 at approximately 175 psia and 60° C. Refrigeration condenser 88 lowers the coolant temperature to approximately 30° C., causing it to liquefy by the time it reaches liquid output line 89. The liquid coolant is held in reservoir 90.

Liquid coolant leaves reservoir 90 by a line 94 and passes through a filter 95, a sight gauge 97, and a small heat exchanger in a line 98 en route to expansion regulator 99. Line 98 is soldered to a segment 79 of line 81 to allow the cooler vapor in segment 79 to withdraw heat from the warmer liquid in line 81. This produces the small heat exchanger referred to above.

Expansion regulator 99 limits its output pressure to 15 psia. The liquid coolant passes from regulator 99 through a line 100 and enters feed tube 30, vaporizes after passing through pin holes 26 and into lower chamber volume 41 which drops its temperature to approximately $-46°$ C. The system should be operated about half an hour to cool the trap to $-20°$ C. as indicated by a thermometer 32 before vapor is passed through trap 10 for decontamination.

Viscous liquids and frozen condensates from the vapor stream entering vapor inlet 13 will gradually build up and restrict the flow of gas through trap 10. The build up rate will vary greatly depending on the contaminants and their vapor pressures and concentrations. Operation of the cold trap with liquid coolant supplied by line 100 at −40° C. should remove enough Isocyanate type chemicals to reduce vacuum pump (not shown) maintenance to a fraction of what is required without such a trap. At a given flow rate, a clean cold trap 10 will have a certain pressure drop from its vapor inlet 13 to its gas outlet 31. The inlet and outlet pressures are preferably indicated by a gauge 33. When this drop has increased by approximately ten percent, the trap should be put through a defrost cycle to melt or liquify contaminant buildup and allow it to run to bottom 22. The collected contaminants can then be drained from the trap through a drain 14.

Trap 10 is put in a heating mode for defrosting by opening solenoid valve 110. Opening valve 110 allows hot vapor exiting compressor 86 at about 150 psia and 80° C. to return by shunt line 108 directly to coolant supply line 100, which feeds tube 30 and expansion chamber 25. This flow path along line 108 is indicated by dashed arrows in FIG. 1. Since the vapor pressures in both lines 108 and 100 are greatly in excess of 15 psia, expansion regulator 99 closes in this mode to prevent flow of coolant through it, and through condenser 88, in either direction, significantly in the forward (from line 98 to line 100) direction.

Over-pressure regulator 82 is used in the heating mode to maintain a back pressure on return line 81, limited by the requirement that pressure regulator 82 not let the pressure in its outlet line 83 exceed a pressure of 45 psia. The hot vapor flowing from line 108, through tube 30 and into lower and upper volumes 41, 42 typically raises the temperature of trap 10 from −40° C. to +20° C. in about 20 minutes.

When the temperature in return line 81 reaches 60° C. the trap is considered thawed, and thermostat 84 automatically turns off the defrosting cycle by closing solenoid valve 110. Valve 110 remains closed until reopened at the start of another defrost cycle.

Details have been disclosed to illustrate the invention in a preferred embodiment of which adaptations and modifications within the scope of the invention will occur to those skilled in the art. The scope of the invention is limited only by the following claims.

What is claimed is:

1. A cold trap system comprising:
    a refrigerant source including a coolant supply line and a vapor return line;
    a generally cylindrical tank defining an internal chamber, a drain, at least one vapor inlet, and an open top;
    a cover sealable to the top of said tank and having an expansion chamber port and a gas outlet;
    a tubular expansion chamber having a top end seatable in said expansion chamber port and extending from said cover for the length of said internal chamber to a closed bottom end, the top end defining a coolant supply port fluidly connected to said coolant supply line and a coolant return port fluidly connected to said vapor return line;
    a hollow feed tube disposed inside said expansion chamber and forming a passage from said coolant supply port to a feed tube outlet hole near the bottom of the expansion chamber; and
    a plurality of axially spaced apart perforated planar disk shaped baffles having center holes sized to fit around and being mounted to said tubular expansion chamber and having outer perimeters sized to fit in said internal chamber.

2. A cold trap system as in claim 1, wherein said vapor inlet is disposed tangentially to said internal chamber, whereby particles in a vapor stream supplied through said inlet to said trap are urged by centrifugal force towards the wall of said internal chamber.

3. A cold trap system as in claim 1, further characterized by a plurality of annular spacers disposed around said expansion chamber and between said baffles, and a snap ring disposed at the inner periphery of said internal chamber, adjacent one said baffle, whereby particles in a vapor stream supplied to said trap are prevented from passing between the periphery of said one baffle and the inner wall of said internal chamber.

4. A cold trap system as in claim 3 wherein said perforated baffles are disposed around said tubular expansion chamber, and wherein individual perforations in at least some of the lower baffles are disposed at a constant radius from the axis of said tubular chamber and are disposed non-parallel to said axis.

5. A cold trap system as in claim 3 wherein the upper baffles are closely spaced vertically and have a high surface-to-volume ratio whereby the upper baffles offer a short mean free path for vapor passing through.

6. A cold trap system as in claim 1 wherein said refrigerant source includes:
    a compressor having an inlet connected to said vapor return line and having a compressor outlet line;
    a condenser connected to said compressor outlet line and having a high pressure liquid output line;
    an expansion regulator having an inlet connected to said liquid output line and having an outlet connected to said coolant supply line.

7. A cold trap system as in claim 6, further comprising a defrost mode hot vapor shunt line connected between said compressor output line and said coolant supply line, said shunt line including a solenoid valve.

8. A cold trap system as in claim 7, further including a crank case over-pressure regulator and a thermostat in said vapor return line.

9. A cold trap, used in combination with a refrigerant source, for removing contaminants from a vapor stream comprising:
    a sealable housing having a circular cross-sectional shape, said housing defining an axis and having a top and a bottom;
    an elongate coolant expansion chamber, fluidly connected to the refrigerant source, mounted to said housing and extending along said axis substantially from said top to said bottom and adapted for cooling the vapor stream; and
    a plurality of spaced apart, flow diverting baffles mounted to and along said expansion chamber, said baffles defining a first centrifugal separator stage near said bottom, a condensation stage toward said top and a second centrifugal separator stage between said first stage and said condensation stage, and wherein a selected type baffle is mounted within said second stage, said selected type baffle including a plurality of passageways formed through said selected type baffle at an angle to the housing axis to impart a rotary flow component to the fluid stream passing through said second centrifugal separator stage.

10. The cold trap of claim 9 wherein said first centrifugal separator stage includes a tangentially directed vapor stream inlet means formed in said housing for introducing the fluid stream into said first centrifugal separator stage to swirl about the axis of the housing.

11. The cold trap of claim 9 further comprising a plurality of second centrifugal separator stages.

12. The cold trap of claim 9 wherein said condensation stage includes a plurality of closely spaced perforated plates.

13. The cold trap of claim 9 wherein said housing is cylindrical.

14. The cold trap of claim 9 wherein said bottom is curved and further comprising a drain port at said bottom.

15. The cold trap of claim 9 wherein said expansion chamber includes an outer housing defining a chamber volume therein and a feed tube mounted within and extending along a substantial portion of the length of said chamber volume, said feed tube including at least one relatively small outlet hole near the bottom of the feed tube allowing coolant to expand after passing through said outlet hole thereby cooling said expansion chamber.

16. The cold trap of claim 15 wherein said at least one outlet hole is oriented to impart a radial flow component to the coolant passing from said feed tube into said chamber volume to enhance heat transfer.

17. The cold trap of claim 15 wherein said chamber volume includes a lower volume and an upper volume separated by a turbulence inducing member.

* * * * *